United States Patent [19]

Oishi et al.

[11] Patent Number: 4,564,157
[45] Date of Patent: Jan. 14, 1986

[54] MAGNETIC RECORDING TAPE CASSETTE

[75] Inventors: Kengo Oishi; Osamu Suzuki, both of Odawara, Japan

[73] Assignee: Fuji Photo Film Co., Ltd., Tokyo, Japan

[21] Appl. No.: 625,018

[22] Filed: Jun. 27, 1984

[30] Foreign Application Priority Data

Aug. 15, 1983 [JP] Japan ............................ 58-126352[U]

[51] Int. Cl.⁴ ........................ G11B 15/32; G11B 15/60
[52] U.S. Cl. ............................... 242/199; 360/130.33; 360/132
[58] Field of Search ................ 242/192, 195, 197–200, 242/55.19 A, 76; 360/130.2, 130.21, 130.3, 130.33, 132, 137

[56] References Cited

U.S. PATENT DOCUMENTS

| | | | |
|---|---|---|---|
| 4,095,758 | 6/1978 | Shroff | 242/192 |
| 4,102,514 | 7/1978 | Ito | 242/199 |
| 4,205,809 | 6/1980 | Lau | 242/199 |
| 4,288,826 | 9/1981 | Sato | 360/130.33 |
| 4,358,807 | 11/1982 | Osanai et al. | 360/130.32 |
| 4,368,497 | 1/1983 | Shirako | 360/132 |

*Primary Examiner*—Leonard D. Christian
*Attorney, Agent, or Firm*—Pasquale A. Razzano

[57] ABSTRACT

A magnetic recording tape cassette includes a cassette casing for accommodating a pair of hubs around which a magnetic recording tape is wound. The casing is provided, in the front face thereof, with a magnetic head receiving opening and a pair of tape member receiving openings on opposite sides of the magnetic head receiving opening. A pair of resiliently displaceable tape supports are provided in the casing to be opposed to the respective tape guide member receiving openings. The tape supports cause the tape to span the magnetic head receiving opening in parallel to the front face of the casing when the cassette is not loaded in a tape recorder. The tape recorder is provided with a pair of tape guide members which are on opposite sides of the magnetic head and are inserted into the tape guide member receiving openings when the cassette is loaded into the tape recorder. Each tape guide member has a pair of collars spaced from each other by a distance substantially equal to the tape width and smaller than the length of the tape support. When the tape guide members are inserted into the corresponding openings, the collars push the tape supports away from the tape with the tape being accommodated between the collars. The tape is guided by the tape guide members during recording and reproduction.

7 Claims, 6 Drawing Figures

MAGNETIC RECORDING TAPE CASSETTE

BACKGROUND OF THE INVENTION

1. Field of the Invention

This invention relates to a magnetic recording tape cassette, and more particularly to a magnetic recording tape cassette in which the magnetic recording tape can be held in the correct position relative to the magnetic head during recording and reproduction.

2. Description of the Prior Art

There has come into practical use a magnetic recording system such as a digital tape recording system in which sound information and/or video information are recorded as digital signals instead of analogue signals. Digital signals are superior to the analogue signals in that they are relatively insensitive to noise and have a high S/N ratio, whereby reproduction quality can be improved. When using the analogue signal, the frequency band may be on the order of 10 KHz. However, in the case of a digital audio tape recording system, a recording region covering a frequency band on the order of about 100 KHz is required.

In order to enlarge the usable frequency band, there is employed a helical rotary head recording system in which the magnetic head for recording and/or reproduction is rotated or a multitrack fixed head recording system in which an increased number of recording tracks are employed. In the case of the multitrack fixed head recording system, approximately ten tracks are required to effect recording having a frequency band on the order of 100 KHz since the maximum recording frequency for one track is limited to 10 to 15 KHz due to limitation in recording wavelength. Thus, 14 to 20 tracks are required for one way recording when dynamic range and error correction are taken into account. At present it has been proposed to use thirty-six tracks, eighteen tracks for recording each way. When this is applied to a Philips type compact cassette in which the tape width is only 3.81 mm, the tape width which can be allotted to each track is as small as 100 μm. In the conventional analog magnetic recording systems, the relative position between the recording tape and the magnetic head is not so critical since the number of the tracks is four at the most and a relatively large tape width can be allotted to each track. However, in the digital audio tape recording system in which each track can be allotted only a very small tape width, the relative position between the recording tape and the magnetic head is very critical.

In the conventional magnetic recording tape cassette, the recording tape is guided by a pair of guide pins which are fixed to the cassette casing on opposite sides of the magnetic head receiving opening formed on the front face of the casing. Since the guide pins are fixed to the cassette casing by insert molding of plastic material, verticality of the guide pins varies due to various factors such as the structure of the molds, the molding condition of the cassette casing and the plastic material used for the molding. Thus, the position of the guide pins relative to the magnetic head varies from cassette to cassette and therefore the position of the tape relative to the magnetic head during running cannot be stabilized so that the magnetic head cannot precisely trace the same track during reproduction as during recording, whereby the reproduction output power is lowered and drop-out occurs frequently.

SUMMARY OF THE INVENTION

In view of the foregoing observations and description, the primary object of the present invention is to provide an improved magnetic recording tape cassette in which the recording tape can be guided to maintain a predetermined correct position relative to the magnetic head of the recording and/or reproducing system.

The magnetic recording tape cassette of the present invention is characterized by having, instead of a pair of guide pins employed in conventional cassettes, a pair of resiliently displaceable tape supports which are held in positions corresponding to the guide pins in the conventional cassettes, i.e., on opposite sides of the magnetic head receiving opening, and can be resiliently displaced away from the recording tape. The tape guides hold the recording tape in a predetermined position when the cassette is not loaded in a tape recorder (The term "tape recorder" should be broadly interpreted to include both recording/reproduction devices and devices for reproduction only in this specification) so that the tape does not interfere with elements of the tape recorder such as a capstan upon loading of the cassette into the tape recorder, and are displaced away from the tape respectively pushed by a pair of tape guide members provided in the tape recorder on opposite sides of the magnetic head. The tape guide members extend in the direction of the width of the recording tape and have a pair of collars spaced from each other by a distance substantially equal to the width of the recording tape. When the cassette is loaded in the tape recorder, the tape guide members in the tape recorder abut against the tape supports to resiliently push them away from the recording tape with the recording tape accommodated between the collars of the respective tape guide members. Then the recording tape runs guided by the tape guide members in the tape recorder which can be precisely located in a predetermined position with respect to the magnetic head.

More particularly, in accordance with the present invention, there is provided a magnetic recording tape cassette comprising a pair of tape hubs, a magnetic recording tape wound around the hubs, a cassette casing for accommodating therein the tape hubs and the magnetic recording tape, a pair of guide rollers rotatably mounted in the cassette casing to guide the recording tape and a pair of resiliently displaceable tape supports which are respectively disposed on opposite sides of a magnetic head receiving opening formed in the cassette casing and hold the recording tape in a predetermined position, a pair of opening means formed in the casing opposed to the respective tape supports to give access to the tape supports, the tape supports being adapted to be displaced away from the recording tape pushed by a pair of tape guide members provided in a tape recorder on opposite sides of a magnetic head, each tape guide member being provided with a pair of collars spaced from each other in the direction of the width of the recording tape by a distance substantially equal to the width of the recording tape, and being adapted to abut against the corresponding tape support to resiliently push it away from the recording tape with the recording tape accommodated between the collars when the cassette is loaded in the tape recorder so that during operation the recording tape runs under the guidance of the pair of tape guide members.

In one preferred embodiment of the present invention, said pair of tape supports are mounted on respective end portions of a resilient arm which is mounted on said cassette casing at an intermediate portion thereof.

In accordance with another aspect of the present invention, there is provided a magnetic recording tape cassette in combination with a tape recorder comprising a pair of tape hubs, a magnetic recording tape wound around the hubs, a cassette casing for accommodating therein the tape hubs and the magnetic recording tape, a pair of guide rollers rotatably mounted in the cassette casing to guide the recording tape, and a pair of resiliently displaceable tape supports which are respectively disposed on opposite sides of a magnetic head receiving opening formed in the cassette casing and hold the recording tape in a predetermined position, said tape recorder being provided with a pair of tape guide members on opposite sides of a magnetic head, each tape guide member being provided with a pair of collars spaced from each other in the direction of the width of the recording tape by a distance substantially equal to the width of the recording tape, and being adapted to abut against the corresponding tape support in the magnetic recording tape cassette to resiliently push it away from the recording tape with the recording tape accommodated between the collars when the cassette is loaded in the tape recorder so that the recording tape runs under the guidance of the pair of tape guide members.

DESCRIPTION OF THE PREFERRED EMBODIMENT

Figure 1:
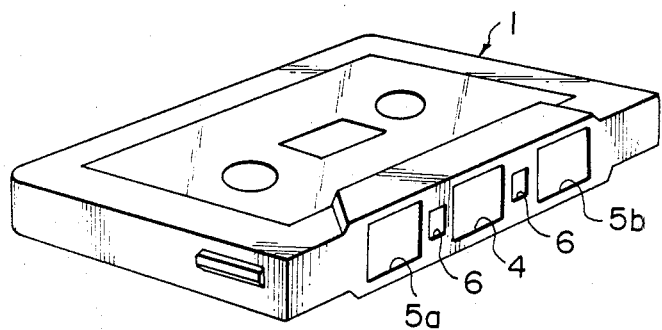
FIG. 1 is a perspective view showing the outside of a magnetic recording tape cassette in accordance with an embodiment of the present invention.
Figure 2:
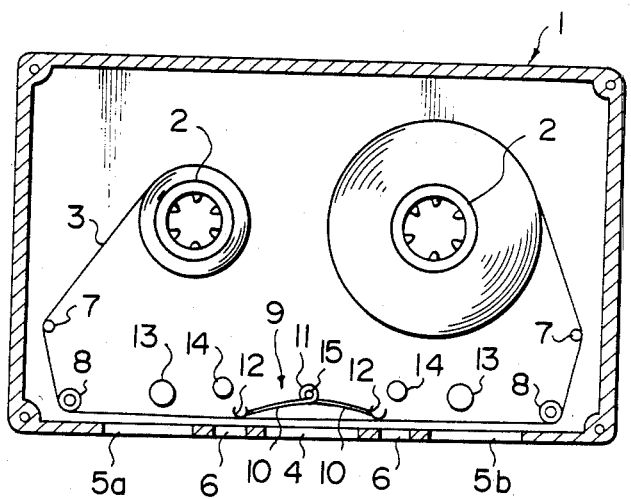
FIG. 2 is a cross-sectional view showing the inside of the cassette.

Referring to FIGS. 1 and 2, a magnetic recording tape cassette in accordance with an embodiment of the present invention includes a casing 1 in which a pair of tape hubs 2 are rotatably mounted. A magnetic recording tape 3 is wound around the hubs 2, and is unwound from one hub 2 to be taken up by the other hub 2 during recording and reproduction. A magnetic head receiving opening 4 is formed in the front face of the cassette casing 1 at the center thereof. A pair of pinch roller receiving openings 5a and 5b are formed in the front face of the casing 1 on opposite sides of the magnetic head receiving opening 4. Further, a pair of tape guide member receiving openings 6 are provided between the magnetic head receiving opening 4 and the respective pinch roller receiving openings 5a and 5b, the purpose of which will become apparent later. The magnetic recording tape 3 is passed around a pair of fixed guide members 7 fixed to the casing 1 and a pair of guide rollers 8 rotatably mounted in the casing 1 so that the tape runs in parallel to the front face of the casing 1 as in conventional cassettes. A resilient arm member 9 is mounted in the casing 1 opposed to the magnetic head receiving opening 4.

Figure 3:
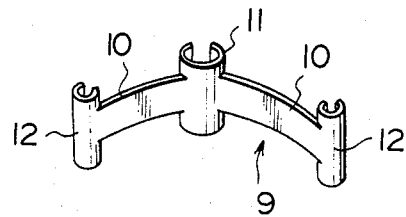
FIG. 3 is a perspective view of a resilient arm member employed in the cassette shown in FIGS. 1 and 2, FIGS. 4 and 5 are schematic views showing the relationships between the cassette of FIGS. 1 and 2 and a tape recorder to be associated therewith, before and after loading of the cassette into the tape recorder, respectively.

As shown in FIG. 3, the resilient arm member 9 comprises a pair of arm portions 10 integrally extending from a central support portion 11 and a pair of tape support portions 12 formed on the respective free ends of the arm portions 10. The central support portion 11 is substantially cylindrical in shape and is engaged with a pin 15 fixed to the base of the casing 1. The tape support portions 12 are positioned opposed to the respective tape guide member receiving openings 6 with the recording tape 3 intervening between the tape support portions 12 and the front face of the casing 1. The tape support portions 12 contact the recording tape 3 from inside to hold the tape 3 in a predetermined position as shown in FIG. 2 when the cassette is not loaded in a tape recorder so that the tape 3 does not interfere with elements of the tape recorder such as capstans (not shown) inserted into the casing 1 from holes 13 formed in the base of the casing 1 and locate pins (not shown) which are inserted into holes 14 to locate the cassette with respect to the tape recorder. The holes 13 are opposed to said respective pinch roller receiving openings 5a and 5b formed in the front face of the casing 1, and when the cassette is loaded in the tape recorder the pinch rollers inserted into the pinch roller receiving openings 5a and 5b are brought into contact with the capstans inserted into the holes 13 with the tape 3 sandwiched therebetween, thereby feeding the tape 3.

Figure 4:
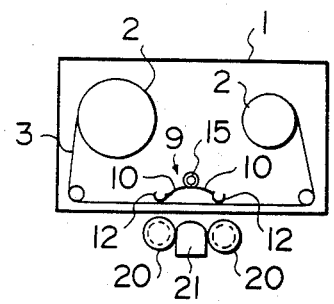
Figure 5:
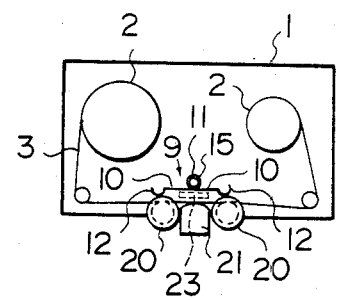
Figure 6:
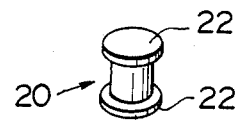
FIG. 6 is a perspective view of a tape guide member employed in the cassette shown in FIGS. 1 and 2.

As shown in FIGS. 4 and 5, the tape recorder is provided with a pair of tape guide members 20 on opposite sides of a magnetic head 21. Each tape guide member 20 is in the form of a cylindrical pin having a pair of collars 22 on opposite ends thereof as shown in FIG. 6. As can be understood from FIGS. 4 and 5, which schematically show conditions before and after loading of the cassette into the tape recorder, the tape guide members 20 are moved in together with the magnetic head 21 and when the magnetic head 21 is received in the magnetic head receiving opening 4, the tape guide members 20 are inserted into the respective tape guide member receiving openings 6. The space between the collars 22 of each tape guide member 20 is substantially equal to the width of the tape 3 and smaller than the length of the tape support portions 12. Accordingly, when the tape guide members 20 are inserted into the tape guide member receiving openings 6, the collars 22 abut against the tape support portions 12 to push them away from the tape 3 with the tape accommodated between the collars 22 of each tape guide member 20 as shown in FIG. 5. Then the tape 3 is guided by the tape guide members 20 to run while maintaining a predetermined position relative to the magnetic head 21.

Though in the above embodiment, the recording tape 3 is pressed against the magnetic head 21 under the tension applied thereto, a tape pad 23 which is typically of felt may be attached to the central support portion 11 of the resilient arm member 9 as shown by the dotted line in FIG. 5 in order to ensure good contact of the tape with the magnetic head.

We claim:

1. A magnetic recording tape cassette suitable for recording and/or playing digital signals magnetically recorded in a multiplicity of narrowly spaced tracks on a magnetic tape, comprising a pair of tape hubs, said magnetic tape being wound around the hubs, a cassette casing for accommodating therein the tape hubs and the magnetic recording tape, a pair of guide rollers rotatably mounted in the cassette to guide the tape between said reels and past a front side of the cassette casing, a magnetic head receiving opening disposed centrally on said front side of said casing and through which a magnetic recording and/or playback head can be inserted to contact said tape, a pair of tape guide openings disposed on either side of said magnetic head receiving opening on said front side of said cassette casing, a pair of tape supports within said casing and respectively disposed on opposite sides of said magnetic head receiving opening at the positions of said tape guide openings, and resilient means mounting said tape supports yieldably biasing said supports towards said tape guide openings and permitting displacement of said tape supports away from said openings, the tape supports being of sufficient with and suitably positioned to be displaced away from the magnetic recording tape by a respective pair of tape guide members provided in a tape recorder on opposite sides of a magnetic head in said recorder, each tape guide member being provided with a pair of collars having inside portions spaced from each other in the direction of tape width of said tape by a distance substantially equal to the width of said tape, the collars having outside portions spaced from each other by a distance smaller than the width of the respective guide openings to permit insertion of said tape guides into said tape guide openings, said collars including means for abutting against the corresponding tape support to push the same away from the recording tape with the recording tape accommodated between the collars when the cassette is loaded into the tape recorder such that during operation the tape runs in a fixed path relative to said head under the guidance of the pair of tape guide members.

2. A magnetic tape cassette as defined in claim 1, wherein said means mounting said pair of tape supports includes at least one resilient arm member, with said tape supports being affixed onto respective end portions thereof with a portion thereof being mounted at an intermediate portion of said cassette casing.

3. A magnetic tape cassette as defined in claim 1 or claim 2, wherein said distance between the inside portions of said collars is smaller than the length of the corresponding tape supports in the tape width direction, so that the collars of the tape guide members abut against the tape supports to push them away from the tape.

4. A magnetic recording tape cassette as defined in claim 1 or claim 2, wherein said front side of said casing is further provided with a pair of pinch-roller receiving openings disposed on opposite sides of said magnetic head receiving opening, and outward of said tape guide openings, and said tape cassette casing further has capstan openings corresponding to the pinch-roller receiving openings, in which capstan openings a capstan can be inserted, with said tape passing between the locations of said capstan openings and the associated pinch-roller receiving openings.

5. A magnetic recording tape cassette in combination with a tape recorder, the cassette comprising a pair of tape hubs, a magnetic recording tape wound around said hubs, a cassette casing for accommodating therein the tape hubs and the magnetic recording tape, a pair of guide rollers rotatably mounted in the cassette to guide the tape between said reels and past a front side of the cassette casing, a magnetic head receiving opening disposed centrally on said front side of said casing and through which a magnetic recording and/or playback head can be inserted to contact said tape, a pair of tape guide openings disposed on either side of said magnetic head receiving opening on said front side of said cassette casing, a pair of tape supports within said casing and respectively disposed on opposite sides of said magnetic head receiving opening at the positions of said tape guide openings, and resilient means mounting said tape supports yieldably biasing said supports towards said tape guide openings and permitting displacement of said tape supports away from said openings; said tape recorder comprising a magnetic recording and/or playback head and a pair of tape guide members disposed on opposite sides of said magnetic head, each said tape guide member including a pair of collars having inner sides spaced from each other in the tape width direction of the recording tape and positioned to abut against the corresponding tape support in the magnetic recording tape cassette to push the support away from the tape with the recording tape accommodated between the collars when the cassette is loaded into the tape recorder so that the recording tape runs accurately in a predetermined path across said head under the guidance of the pair of tape guide members.

6. A magnetic recording tape cassette and tape recorder combination as recited in claim 5, wherein said front side of said casing is further provided with a pair of pinch-roller receiving openings on opposite sides of said magnetic head receiving opening and outward of said tape guide openings to receive a pinch roller of said recorder, and said tape cassette casing further has capstan openings corresponding to the pinch-roller receiving openings into which a drive capstan of the recorder is inserted with the tape passing between said capstan and said pinch roller.

7. A magnetic recording tape cassette and tape recorder combination as recited in claim 5 or claim 6, wherein the spacing between the collars of each said tape guide member is substantially equal to the width of said tape.

* * * * *